Sept. 30, 1958  J. R. PALM  2,853,817
MAP HOLDER
Filed Sept. 28, 1953  4 Sheets-Sheet 2
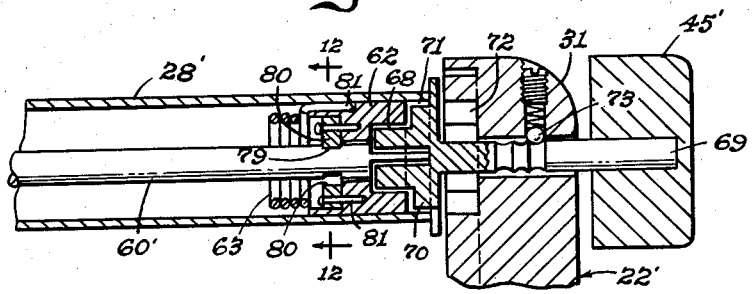
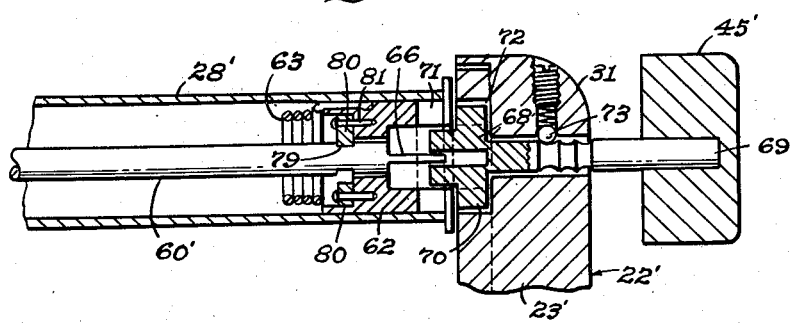
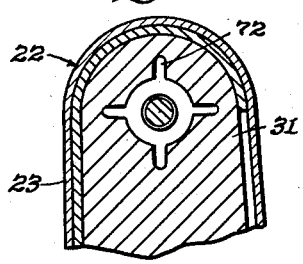
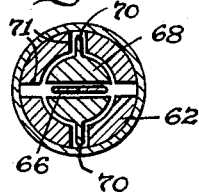
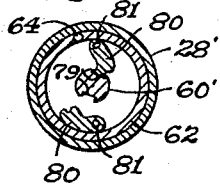
Inventor
John R. Palm
Atty.

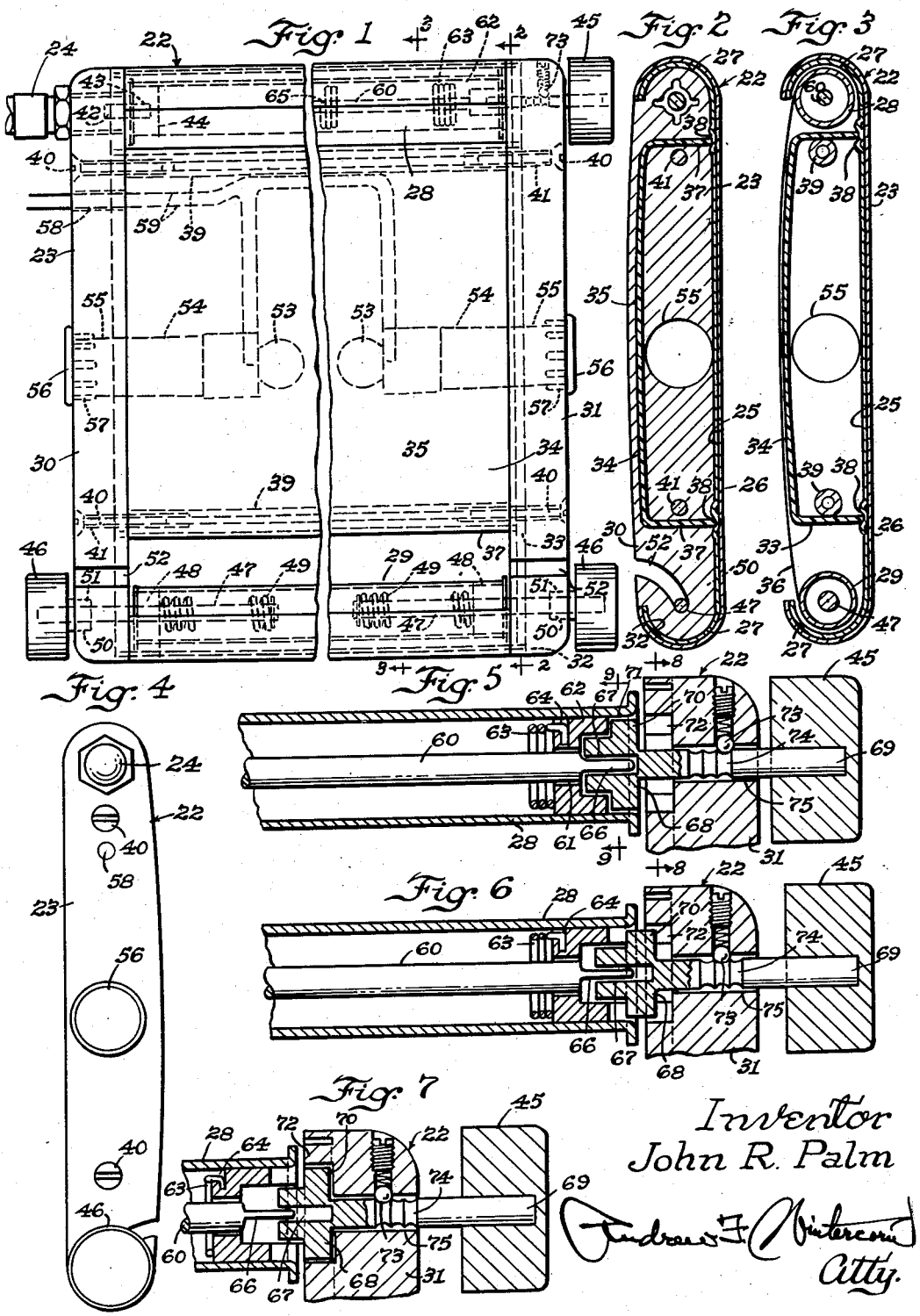

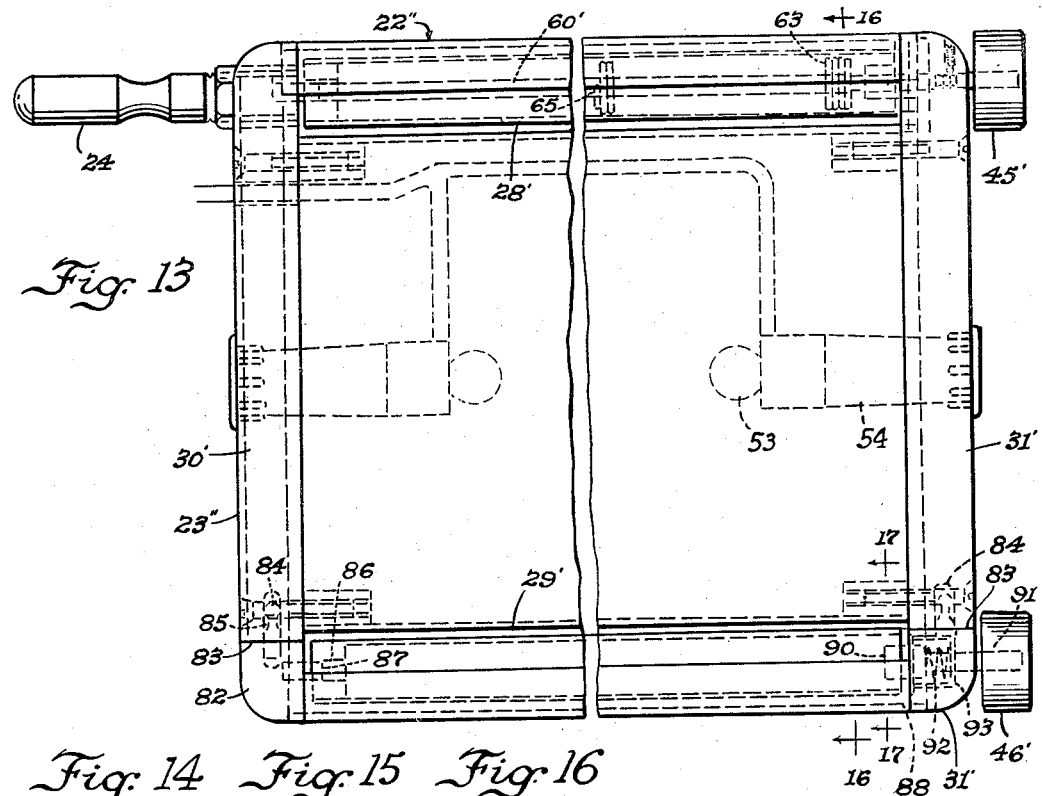
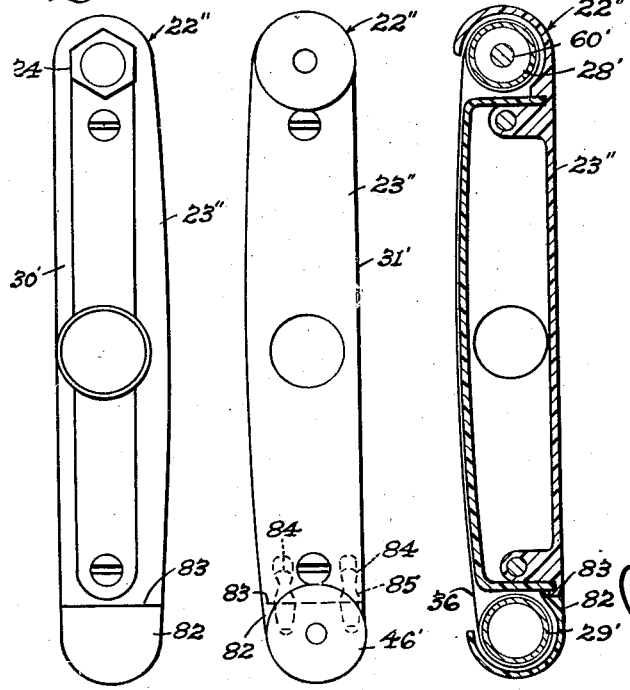
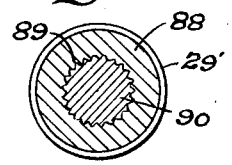

Sept. 30, 1958  J. R. PALM  2,853,817
MAP HOLDER
Filed Sept. 28, 1953  4 Sheets-Sheet 4
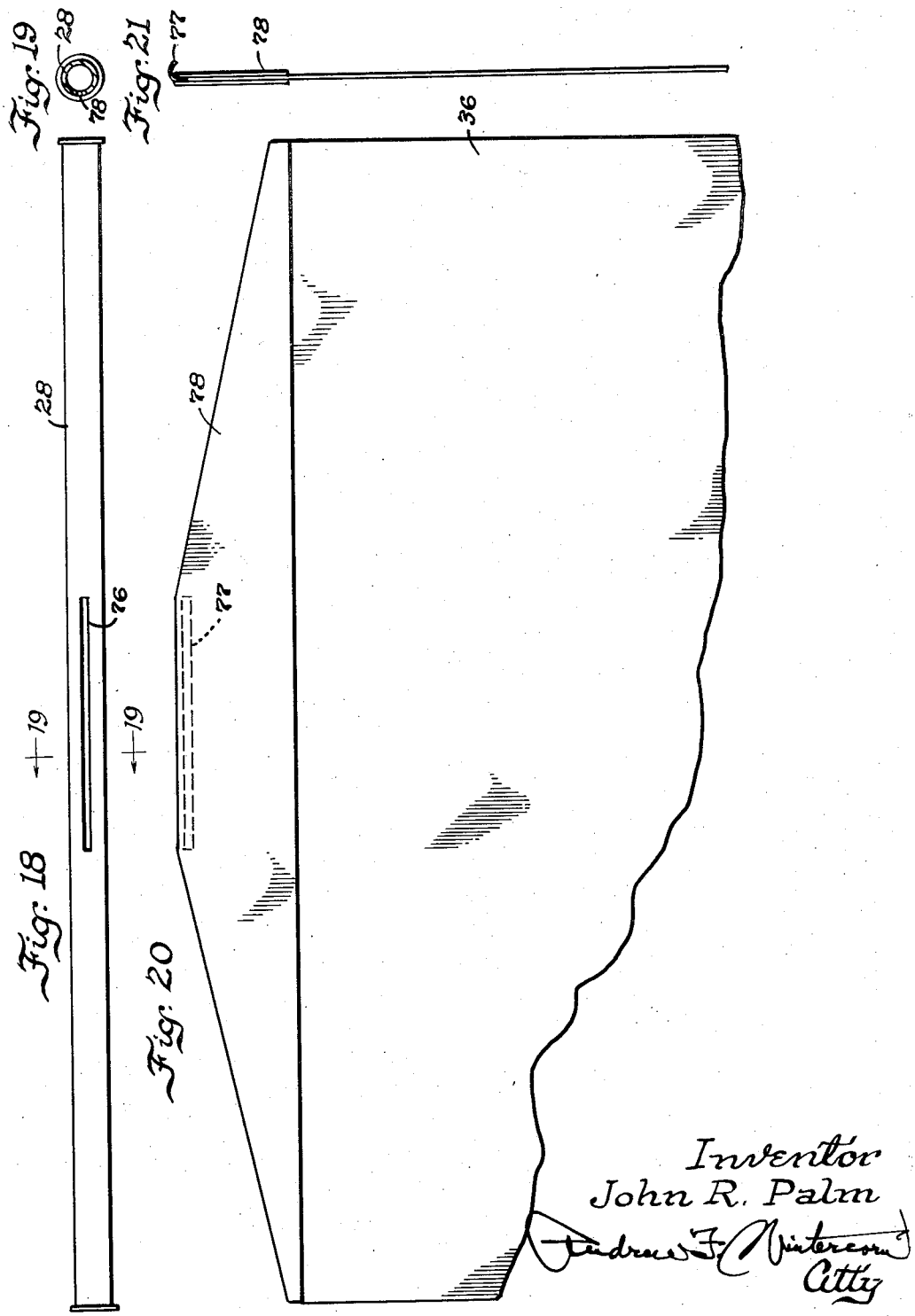
Inventor
John R. Palm

United States Patent Office 2,853,817
Patented Sept. 30, 1958

2,853,817

MAP HOLDER

John R. Palm, Rockford, Ill.

Application September 28, 1953, Serial No. 382,763

18 Claims. (Cl. 40—86)

This invention relates to a new and improved combination windshield sun-visor and road map holder for vehicles, such as automobiles and trucks.

The principal object is to provide a device of the character described designed to receive a map in roll form so that the route marked on such a map can be on a large enough scale for easy reading, the opposite end portions of the map being wound on rollers that are manually rotatable in either direction to enable quick and easy adjustment of the map to expose any desired section and enable adjustment from time to time during a trip as progress in the direction of a given destination is made. Provision is made in the visor casing for illumination of the map to make it easily readable in the dark so that the device is usable day and night. A transparent support is therefore provided between the two rollers over which the map is arranged to slide, and the light or lights are provided behind this support. The support also enables writing or marking on the map without danger of puncturing it.

The upper roller, in accordance with my invention, includes a coiled torsion spring within the roller connected at one end to a rod on which the roller is rotatable and at the other end to the roller, whereby to maintain the map under tension and facilitate pulling out a good length of the map when the lower roller is withdrawn from the case and the map is pulled out as in the pulling down of a rolled-up curtain. In one form the lower roller is on a detachable lower section of the visor, thereby facilitating the spreading out of an appreciable length of the map for inspection, while still permitting replacement easily enough of the detachable lower section when the map is to be used in the usual way, viewing only that portion exposed on the visor between the two rollers. In another form the top roller has gravity type pawl detents for detachably locking the roller to the rod, as in a curtain rod, and a two-position knob is employed in connection with the roller, which in one position allows the roller to turn under spring action or against it, like a curtain rod, while the knob is locked against turning, and which in the other position connects the roller to the knob for rotation with the knob in either direction. In still another form the spring has no locking pawls but a three-position knob is employed in connection with the roller, which in one position connects the roller to turn with the knob, and in another position locks the roller and knob against turning, and in still another position locks the knob against turning but permits rotation of the roller under spring action or against it, like a curtain rod.

In that form in which the lower roller is detachable, it has coiled compression springs in both ends connected with the control knobs on the roller, and these springs serve both to urge the knob inwardly to hold the roller in place in the casing, and as a friction drag for the roller.

While the invention has been disclosed as embodied in and forming a part of an automobile windshield sun-visor, is should be understood that the invention is also applicable broadly to any type of vehicle and to any size and shape of casing as, for example, any portable casing or even a pocket type, and while reference is made herein to roll type maps, it should be obvious that the rolled material does not necessarily have to be a map.

Referring to the drawings—

Fig. 1 is a rear view of a combination sun-visor and road map holder made in accordance with my invention, the same having a large intermediate portion of its length broken away to enable showing the parts on a larger scale, and the map being removed in order to show the rollers and other parts that would otherwise be hidden;

Figs. 2 and 3 are sections on the correspondingly numbered lines of Fig. 1;

Fig. 4 is an end view taken from the left-hand end;

Figs. 5, 6 and 7 are enlarged sectional details of the upper roller showing the control knob in its three different operative positions;

Figs. 8 and 9 are sectional details on the correspondingly numbered lines of Fig. 5;

Figs. 10 and 11 are views similar to Figs. 5 to 7 showing another upper roller with a two-position knob in its two operative positions;

Fig. 12 is a sectional detail on the line 12—12 of Fig. 10;

Fig. 13 is a view similar to Fig. 1 showing another combination sun-visor and map holder of modified or alternative construction;

Fig. 14 is an end view of Fig. 13 taken from the left-hand end;

Fig. 15 is an end view taken from the right-hand end;

Fig. 16 is a section on the line 16—16 of Fig. 13;

Fig. 17 is an enlarged sectional detail of the lower roller taken on the line 17—17 of Fig. 13;

Fig. 18 is a view of one of the map rollers showing the map receiving slot therein;

Fig. 19 is a section on the line 19—19 of Fig. 18 through the slotted portion;

Fig. 20 is a view of one end portion of a roll map, and

Fig. 21 is an edgewise view of Fig. 20.

Similar reference numerals are applied to corresponding parts throughout the views.

Referring first to Figs. 1 to 9, the combination sun-visor and map holder indicated generally by the reference numeral 22 is similar in size and shape generally and designed to replace the conventional sun-visor in a vehicle. The hollow casing 23 thereof, which is of generally rectangular form, has an interchangeable stud 24 extending from the upper left or right-hand corner thereof for pivotally and universally hingedly mounting the device in the car over the windshield at the driver's or passenger's position. The casing 23 may be made up in whole or in part of molded plastic material, or partly plastic material and partly metal. Thus, the main body portion 25 is of formed sheet metal with a covering 26 of leatherette or other decorative material glued to the outside thereof, the sheet metal being bent to the channel form indicated at 27 at the top and bottom of the casing to define chambers to house the top and bottom rollers 28 and 29. End-pieces 30 and 31, which may be of metal or any other suitable or preferred material, have recesses 32 provided therein to accommodate the ends of the sheet metal body 25, and other recesses 33 to accommodate the opposite ends of a map support 34. The latter is generally channel-shaped in cross-section, as shown in Figs. 2 and 3, the cross-portion 35 of the channel providing a flat surface on which the map, indicated at 36 in Fig. 3, is adapted to rest and slide in either direction, the two legs 37 of the channel extending toward the opposite side of the casing and being received in grooves 38 defined in the sheet metal of the body portion 25. Tie-bars 39, which may be of metal or any other suitable or preferred material, extend lengthwise of the unit inside the chamber defined between the map support 34 and the wall of the casing and have threaded holes provided therein in which screws 40 are entered through holes 41 provided in the end-pieces 30 and 31 and registering with threaded holes in the ends of the tie-bars. The upper roller 28 is more or less permanently assembled in the upper portion of the visor and is rotatably mounted at one end on the end-piece 30 by means of a pin 42 projecting from the end-piece and received in a bearing hole 43 provided in the bushing 44 in the end of the roll. The other end of the roller 28 is attached in a special way onto a knob 45, as indicated in Figs. 5, 6 and 7, so that the roller 28 may be turned by means of the knob 45, as in Fig. 5, or may be locked against turning, as in Fig. 6, or may turn freely with respect to the knob, under action of its spring 63, as in Fig. 7.

The roller 29 is readily removable and replaceable in the lower portion of the visor, this roller having at each end a knob 46 carried on the end of a stem 47 reciprocable but not rotatable in a bushing 48 mounted in the end of the roller and having a coiled compression spring 49 mounted on its inner end portion within the roller, caged between the inner end of the stem and bushing, so that the knobs 46 may be pulled outwardly to disengage their reduced hub portions 50 from bearing sockets 51 provided in the end-pieces 30 and 31 and permit the stems 47 to be slid upwardly and forwardly out of the arcuate slots 52 provided in the end-pieces 30 and 31 communicating with the sockets 51. Each stem 47 for its slip-connection with the related bushing 48 may utilize the same construction as appears in Fig. 17.

Electric light bulbs are indicated at 53 suitably spaced inwardly from the opposite ends of the visor in the chamber defined behind the map support 34. This map support is made out of transparent or at least translucent plastic material so that when the electric lights 53 are turned on the map will be illuminated sufficiently to enable easily reading the same in the dark. Hence, the present device may be used day or night with equal facility. The electric light bulbs 53 are in sockets carried on the inner ends of cylindrical supports 54 entered through holes 55 provided in the end-pieces 30 and 31, said supports having enlarged heads 56 on their outer ends which serve to limit inward movement and circumferentially spaced spring fingers 57 which frictionally grip the sides of the holes 55 to hold the supports 54 in set positions, while permitting withdrawal of the supports easily whenever it may be necessary to replace a light bulb. A hole 58 provided in the end-piece 30 permits wires 59 to be extended from the light bulbs for connection with the battery of the automobile or with a separate battery or batteries, a switch (not shown) being included in connection with the wires 59 to open and close the circuit.

Referring next to Figs. 5, 6 and 7, the upper roller 28 is preferably spring-tensioned like a curtain rod and for this purpose has a rod 60 in its one end mounted in a bearing 61 provided in a bushing 62 fixed in the end of the roller, a coiled torsion spring 63, which is disposed inside the roller and has its one end fixed to the bushing 62, being disposed in coaxial relation to the rod 60 and having its other end 65 fixed to the inner end of the rod. The outer end of the rod 60 is flattened to form a diametrically extending key 66. This key fits in a diametrically extending slot 67 provided in a head 68 provided on the inner end of a stem 69, to the outer end of which the knob 45 is secured. The head 68 is cylindrical to permit rotation of bushing 62 thereon, as in Fig. 7, but has projecting from it on diametrically opposite sides key projections 70, which, when the knob 45 is moved in or out are adapted to have interlocking engagement either in radial slots 71 provided in the outer end of the bushing 62, as shown in Figs. 5 and 9, or in radial slots 72 provided in the end-piece 31, as shown in Figs. 7 and 8. When the knob is in a mid-position, as shown in Fig. 6, these keys 70 engage in both sets of slots 71 and 72. In the first instance (Fig. 5), the roller 28 is rotatable with the knob 45 independently of any loading of spring 63. In the second instance (Fig. 7), the roller is rotatable under action of spring 63 or against its action but the knob is held against turning, and the roller is subject to whatever spring tension has been built up in spring 63. In the third instance (Fig. 6), the roller and knob are both held against turning. A ball-detent 73 is spring-pressed into engagement with either of three annular grooves 74 provided in the stem 69, the stem extending through a hole 75 in the end-piece 31 and the grooves 74 having their troughs spaced in such relationship to the rest of the construction that the ball-detent 73 engages in the outermost groove 74 in the first instance (Fig. 5), in the innermost groove 74 in the second (Fig. 7), and in the middle groove in the third instance (Fig. 6). However, it requires only a slight pressure or pull on the knob to shift the same from one position to another.

Referring next to Figs. 18 to 21, the rollers 28 and 29 are alike in so far as their hollow tubular construction is concerned and the fact that each has an elongated slot 76 provided in the wall thereof extending lengthwise of the middle portion, each adapted to receive an elongated tab or lug 77 provided at the middle of a flexible metallic reinforcement 78 on the end of the rolled map 36.

In operation, the map 36 is attached at its free end by lug 77 in the slot 76 of the upper roller 28 and is wound on that roller until there is just enough length of map left to extend from the top to the bottom of the visor 22, whereupon the lug 77 on the other end of map 36 is entered in the slot 76 in the roller 29 and that roller is turned in the opposite direction with respect to the wind-up rotation of roller 28 until all of the slack is taken up. The winding is then continued on roller 29 until the portion of the map that happens to be of interest at that time is left exposed between the two rollers. During such an operation knob 45 is in position of Fig. 5, in which case the map is loaded and adjusted independently of spring 63.

In the event it is desired to see a large portion of the map at one time the operator need only pull knob 45 to position of Fig. 7, then pull outwardly on knobs 46 and lift them in slots 52 to remove lower roller 29 from case. Whereupon as much of the map may be unwound from roller 28 and/or roller 29 as may be desired. During such an operation the map is under tension from roller 28 through spring 63 and will rewind back on roller 28 if released. If desired, the map can be locked in the extended position by pushing knob 45 in position of Fig. 6. To replace map from extended position, the map can be wound directly on roller 29 by rotating knobs 46 or preferably released to rewind back on roller 28. Lower roller 29 is then replaced in the casing, knob 45 is put in the position of Fig. 5 and the map is ready for normal operation as shown in Figs. 1 and 5 and may be rotated in either direction by turning knob 45 or 46.

To facilitate loading map through use of spring 63 it is only necessary to proceed as in extending a larger portion of map and unwind entire map from top roller 28. At this point knob 45 is moved to the position of Fig. 6. In this position, roller 28 is locked and map lug 77 is removed from slot 76. The lower portion of the map is then unwound and detached from roller 29 and roller 29 is replaced in visor case. The visor is now ready for loading another map therein with the aid of spring 63. Lug 77 of the new map is next inserted in slot 76 of roller 28. The lower end of map is held with one hand and the other hand is used to pull knob 45 into Fig. 7 position. Then the map is released to allow spring-activated roller 28 to wind up the map and then knob 45 is put in Fig. 5 position. Next the lower lug 77 is inserted into slot 76 of roller 29 and the procedure as previously described is followed to complete loading and adjustment of map to desired position.

In Figs. 10 to 12 I have shown an upper roller 28 of modified or alternative construction having a two-position control knob 45' that is adapted to be set in either of the positions of knob 45 shown in Figs. 5 and 7, the head 68 on the inner end of the stem 69 being of the same construction as the head 68 on the stem 69 of knob 45, and the diametrically opposed key projections 70 on this head being adapted to be entered either in the radial slots 71 provided in bushing 62 or in radial slots 72 provided in the end-piece 31. The reason this two-position knob 45 is practical is that the rod 60 to which the inner end of the spring 63 is connected, has cooperating with notches 79 in the outer end portion a pair of gravity pawls 80 pivotally mounted on bushing 62 at their outer ends, as indicated at 81, whereby to lock the roller to the rod similarly as in a curtain rod, namely, when the roller 28' is slowed up in its rotation with respect to rod 60' enough to give one of the pawls 80 an opportunity to drop by gravity into one of the notches 79, the pawls 80 being otherwise thrown outwardly by centrifugal force away from the rod 60' whenever the roller 28' turns at a relatively high speed. The operation of this construction is otherwise the same as with the construction of Figs. 1 to 9. That is to say, when the knob 45' is pushed in, as in Fig. 10, the map can be wound up on roller 28' by turning the knob. Then if the knob 45' is pulled out, as in Fig. 11, and one pulls on the map to unwind it from the roller, the spring 63 will be wound the same as in the operation of a curtain rod when the shade is pulled down, and the roller can be locked to the rod 60' at any desired position with the spring 63 tensioned to whatever extent is desired, and then the roller 28' can be turned again by means of knob 45' when the knob 45' is pushed in, as in Fig. 10, or, if the spring 63 is to be used in winding up the map again, it is only necessary to pull outwardly on the map a little bit just enough to release the pawl 80 and the roller will then be operated under spring tension in winding up the map. This construction has the advantage over the one previously described even though there is the spring 63 for winding up the map this spring is controlled by the clutching action of the pawls 80 so that the spring is effective when its windup action is desired and is rendered ineffective while under torsion whenever that is desired. Therefore, when unloading and loading maps and when locking a map in extended position it is not necessary to have a separate lock position as in Fig. 6 since the spring can be locked under tension by the locking pawls 80 as previously described. These operations are otherwise performed the same as described when using the three positions.

In the device 22" shown in Figs. 13 to 17 the upper roller is like that shown in Figs. 10 to 12 and accordingly is numbered 28' and its two-position control knob is numbered 45' to agree with those figures. The lower roller 29' is different from the roller 29 and is rotatable by a single knob 46' in either direction. The casing 23" is similar to the casing 23 of Figs. 1 to 9 and the casing 23' of Figs. 10 and 11 in all respects except that the lower portion has a removable bottom section 82, as indicated by the parting line 83, there being a pair of dowel pins 84 on each end of the removable bottom section 82 enterable in holes 85 provided in the cut-off lower ends of the end-pieces 30' and 31' for frictionally securing the section 82 in place and insuring that the lower roller 29 is in proper alignment with the upper roller 28' for proper tracking of the map 36 in its movement in either direction from one roller to the other. With this construction the roller 29' need only have an axial hole 86 in one end to receive the projecting end of a pin 87 for mounting one end of the roller for rotation, and at the other end the roller need have only a bushing 88 with a longitudinally serrated central opening 89 into which a correspondingly longitudinally serrated radially enlarged end portion 90 of a stem 91 can be entered to mount that end of the roller for rotation and at the same time provide a driving connection between that end of the roller and the knob 46' which is fixed on the outer end of the stem 91. A coiled compression spring 92 seated at one end in a recess 93 provided therefor in the removable bottom section 82 surrounds the stem 91 and engages a shoulder on said stem and thereby keeps the serrated end 90 of the stem engaged in the end of the roller 29'. In the operation of this visor there is no disengagement of the roller 29' from its mountings as in the case of the roller 29 in Figs. 1 to 9. The roller 29' remains mounted in the detachable bottom section 82 of the casing, and, in the event it is desired to examine a long length of the map, the bottom section 82 is detached and as much of the map is unwound from the roller 29' or from both rollers 28' and 29' as desired, and then the map can be rewound partly or entirely by the curtain rod action of roller 28', using spring 63, or the bottom section 82 may be first replaced on casing 23" and the map 36 wound back again on roller 29' by rotation of knob 46'. The selection of any desired portion of the map for reading at any time is the same with this construction as with that of Figs. 10 and 11, in the device 22' shown in Figs. 13 to 17. Also it will be noticed that the general construction differs in that the main casing 23" is plastic and the tie-bars are eliminated since threaded holes are provided in bosses formed as a part of 23", in which screws are threaded through end-pieces into the threaded holes thus securing end-pieces, visor case, and map support into one assembly.

It is believed the foregoing description conveys a good understanding of the objects and advantages of my invention. The appended claims have been drawn to cover all legitimate modifications and adaptations.

I claim:

1. In a device of the character described comprising a casing of generally rectangular form, and rollers of elongated form mounted for rotation at their ends on substantially parallel axes in the opposite end portions of said casing adapted to be turned manually to wind roll material from one roller onto the other, and vice versa, knob-operated means connected with the ends of said rollers for manually turning the same in either direction, the knob-operated means for one of said rollers including knobs at opposite ends of said roller having reduced hub portions which engage detachably in bearings provided in the ends of said casing, stems on said knobs extending through bearings provided in the ends of said roller, and coiled compression springs carried on said stems inside said roller urging the knobs inwardly so as to hold their reduced hub portions assembled in the bearings in said casing and exert a friction drag effect resisting rotation of said roller, said casing having slots provided in the end portions thereof extending from said bearings in said casing to the exterior of said casing through which said stems are movable when the knobs are pulled out far enough to disengage the reduced hub portions from said bearings in said casing, whereby to permit removal and replacement of said roller.

2. In a device of the character described comprising a casing of generally rectangular form, and rollers of elongated form mounted for rotation at their ends on substantially parallel axes in the opposite end portions of said casing adapted to be turned manually to wind roll material from one roller onto the other, and vice versa, knob-operated means connected with the ends of said rollers for manually turning the same in either direction, the casing having the end portion thereof in which one of said rollers is mounted detachable from and attachable to the adjacent end of the casing, whereby, without removal of the roller mounted therein, to permit movement of said roller with said detachable end portion to remote relationship to the other roller in unwinding from one or both rollers an appreciable length of the roll material for viewing at one time.

3. In a device of the character described comprising a casing of generally rectangular form, and rollers of elongated form mounted for rotation at their ends on substantially parallel axes in the opposite end portions of said casing adapted to be turned manually to wind roll material from one roller onto the other, and vice versa, knob-operated means connected with the ends of said rollers for manually turning the same in either direction, the knob-operated means for one of said rollers including a rod rotatably mounted in one end of said roller, an elongated coiled torsion spring surrounding said rod and having one end connected thereto and the other end connected to said roller to transmit rotary motion thereto relative to said rod when the spring is wound up, the end of said rod projecting from said roller providing a key, a knob externally of said casing, a stem extending from said knob through a bearing in said casing, and a head on said stem having a cylindrical portion received in a bearing in the end of said roller, said head having a slot slidably receiving said key permitting endwise movement of said head with said stem and knob relative to said roller, said head having substantially radial key projections thereon which are engageable selectively either in radial slots provided in the end of said roller to fix the roller to turn with the knob, or in radial slots provided in said casing to fix the knob to the casing but allow the roller to turn.

4. A device as set forth in claim 3 wherein said key projections are also engageable in an intermediate position in both of said radial slots at one time to lock the knob and roller against turning.

5. A device as set forth in claim 3 including an elongated gravity pawl pivoted at one end in said roller on an axis parallel to said rod and movable inwardly under gravity for engagement at its other end with said rod to lock the roller to the rod detachably and prevent rotation of the roller under action of said spring, said pawl being disengageable from the rod by rotation of the roller relative to the rod in a spring-winding direction and being movable outwardly under centrifugal force.

6. A device as set forth in claim 3 including detent means for releasably securing said knob and stem in either of the two positions of the knob.

7. A device as set forth in claim 4 including detent means for releasably securing said knob and stem in either of the three positions of the knob.

8. A device as set forth in claim 5 including detent means for releasably securing said knob and stem in either of the two positions of the knob.

9. In a device of the character described comprising a casing of generally rectangular form, and rollers of elongated form mounted for rotation at their ends on substantially parallel axes in the opposite end portions of said casing adapted to be turned manually to wind roll material from one roller onto the other, and vice versa, knob-operated means connected with the ends of said rollers for manually turning the same in either direction, said knob-operated means for one of said rollers including knobs at opposite ends of said roller having reduced hub portions which engage detachably in bearings provided in the side members, stems on said knobs extending through bearings provided in the ends of said roller, and coiled compression springs carried on said stems inside said roller urging the knobs inwardly so as to hold their reduced hub portions assembled in the bearings in said side members and exert a friction drag to resist rotation of said roller, said side members having slots provided therein extending from said bearings to the exterior of said side members through which said stems are movable when the knobs are pulled out far enough to disengage the reduced hub portions from said bearings, whereby to permit removal and replacement.

10. A device as set forth in claim 9, wherein one end portion of said body member in which one of said rollers is mounted is detachable from and attachable to the rest of the body member, whereby, without removal of said roller, to permit movement of said roller with said detachable portion to remote relationship to the other roller in unwinding an appreciable length of roll material from one or both rollers for viewing at one time.

11. In a device of the character described comprising a casing of generally rectangular form, and rollers of elongated form mounted for rotation at their ends on substantially parallel axes in the opposite end portions of said casing adapted to be turned manually to wind roll material from one roller onto the other, and vice versa, knob-operated means connected with the ends of said rollers for manually turning the same in either direction, the knob-operated means for one of said rollers including a rod rotatably mounted in one end of said roller, an elongated coiled torsion spring surrounding said rod and having one end connected thereto and the other end connected to said roller to transmit rotary motion thereto relative to said rod when the spring is wound up, the end of said rod projecting from said roller providing a key, a knob externally of said device, a stem extending from said knob through a bearing in the adjacent side member, and a head on said stem having a cylindrical portion received in a bearing in the end of said roller, said head having a slot slidably receiving said key permitting endwise movement of said head with said stem and knob relative to said roller, said head having substantially radial key projections thereon which are engageable selectively either in radial slots provided in the end of said roller to fix the roller to turn with the knob, or in radial slots provided in said side member to fix the knob to the side member but allow the roller to turn.

12. A device as set forth in claim 11, wherein said key projections are also engageable in an intermediate position in both of said radial slots at one time to lock the knob and roller against turning.

13. A device as set forth in claim 11, including an elongated gravity pawl pivoted at one end in said roller on an axis parallel to said rod and movable inwardly under gravity for engagement at its other end with said rod to lock the roller to the rod detachably and prevent rotation of the roller under action of said spring, said pawl being disengageable from the rod by rotation of the roller relative to the rod in a spring-winding direction and being movable outwardly under centrifugal force.

14. A device as set forth in claim 11, including detent means for releasably securing said knob and stem in either of the two positions of the knob.

15. A device as set forth in claim 12, including detent means for releasably securing said knob and stem in either of the three positions of the knob.

16. A device as set forth in claim 13, including detent means for releasably securing said knob and stem in either of the two positions of the knob.

17. A device of the character described comprising a casing of generally rectangular form, and rollers of elongated form mounted for rotation at their ends on substantially parallel axes in the opposite end portions of said casing adapted to be turned manually to wind and unwind roll material from one roller onto the other, and vice versa, the improvement which consists in providing bayonet slots in registering relation in the opposite ends of said casing having their inner ends on the axis of rotaton of one of said rollers and recesses in the ends of said casing concentric with the inner ends of said slots, the one roller having knobs mounted by means of axial stems on the ends of said roller, the stems extending through said slots and being slidably but non-rotatably mounted in the ends of said roller to permit turning the roller by means of said knobs, and said knobs having reduced cylindrical shank portions rotatably engageable in said recesses.

18. A device of the character described comprising a casing of generally rectangular form, and rollers of elongated form mounted for rotation at their ends on substantially parallel axes in the opposite end portions of said casing adapted to be turned manually to wind and unwind roll material from one roller onto the other, and vice versa, the improvement which consists in providing bayonet slots in registering relation in the opposite ends of said casing having their inner ends on the axis of rotation of one of said rollers and recesses in the ends of said casing concentric with the inner ends of said slots, the one roller having knobs mounted by means of axial stems on the ends of said roller, the stems extending through said slots and being slidably but non-rotatably mounted in the ends of said roller to permit turning the roller by means of said knobs and said knobs having reduced cylindrical shank portions rotatably engageable in said recesses, and spring means in said roller normally urging said stems inwardly whereby to hold said knobs engaged in said recesses.

References Cited in the file of this patent

UNITED STATES PATENTS

| | | |
|---|---|---|
| 464,901 | Sheets | Dec. 8, 1891 |
| 1,023,933 | Folmer | Apr. 23, 1912 |
| 1,460,435 | Newman | July 3, 1923 |
| 1,665,272 | Myers | Apr. 10, 1928 |
| 1,759,241 | Myers | May 20, 1930 |
| 1,814,690 | Haack | July 14, 1931 |
| 1,894,233 | Ellis | Jan. 10, 1933 |
| 1,957,378 | Zimmerman | May 1, 1934 |
| 1,967,676 | Marchev | July 24, 1934 |
| 2,107,020 | Williams | Feb. 1, 1938 |
| 2,188,377 | Small | Jan. 20, 1940 |
| 2,221,451 | Jones | Nov. 12, 1940 |
| 2,306,634 | MacDonald | Dec. 29, 1942 |
| 2,546,483 | Venters | Mar. 27, 1951 |
| 2,563,580 | Clark | Aug. 7, 1951 |
| 2,591,844 | Macripo | Apr. 8, 1952 |
| 2,721,409 | Bland | Dec. 29, 1955 |

FOREIGN PATENTS

| | | |
|---|---|---|
| 588,698 | Great Britain | May 30, 1947 |
| 657,281 | Great Britain | Sept. 12, 1951 |
| 156,244 | Great Britain | Mar. 5, 1953 |